UNITED STATES PATENT OFFICE.

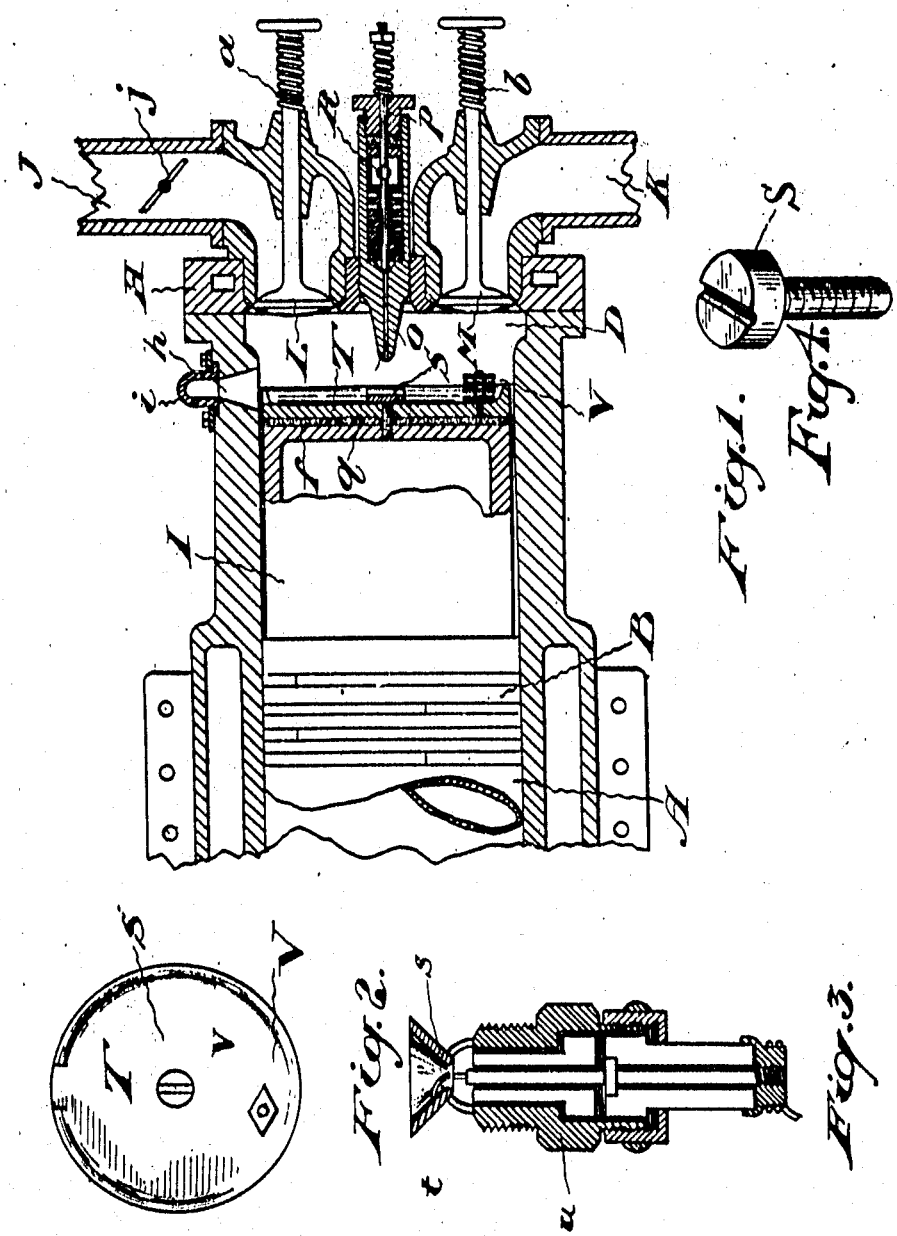

HOWARD A. JOHNSTON, OF TORONTO, ONTARIO, CANADA.

INTERNAL-COMBUSTION ENGINE.

No. 895,466.

Specification of Letters Patent.

Patented Aug. 11, 1908.

Application filed February 11, 1907. Serial No. 356,738.

*To all whom it may concern:*

Be it known that I, HOWARD A. JOHNSTON, of the city of Toronto, in the Province of Ontario, Canada, have invented certain new and useful Improvements in Internal-Combustion Engines, of which the following is a specification.

My object is to devise improvements on an engine in which the combustion of a jet of liquid fuel was caused to take place by spraying it into a hot combustion chamber directly against an igniter adapted to be maintained by the heat of combustion at a temperature above the ignition point of the fuel.

As considerable difficulty is experienced in maintaining the igniter at a sufficiently high temperature to properly ignite the fuel when the whole stream of the latter is directed against it, I provide a spreader against which the fuel is directed, and so locate the igniter that a portion of the fuel splashing from the spreader contacts therewith.

To avoid the trouble and uncertainty of starting the engine by heating the interior of the combustion chamber with a torch I provide the engine with a special starting igniter which may be heated from the outside without requiring the combustion chamber to be opened up.

When the engine is running on a very light load an insufficient quantity of fuel is burned to keep the igniter hot enough to do its work. I overcome the difficulty by providing the air inlet pipe with a throttle valve, and by using a comparatively light spring on the exhaust valve. By throttling the air I permit a portion of the exhaust to be sucked back into the combustion chamber on the suction stroke, and as this exhaust is of course hot the temperature of the combustion chamber is not reduced as much as it would be by the admission of all cold air.

Figure 1 is a longitudinal section through the combustion chamber of the engine. Fig. 2 is an end view of the extension of the piston. Fig. 3 is a sectional detail of a modification of the starting igniter. Fig. 4 is a perspective view of the fuel distributer.

In the drawings like letters of reference indicate corresponding parts in the different figures.

My engine in its main features is similar to those now on the market, and I therefore describe only such parts of it as are necessary to the understanding of my invention.

Referring particularly to Fig. 1, A is the cylinder. Within the cylinder is fitted the piston B. D is a combustion chamber formed as an extension of the cylinder, that is to say, it is axially in line and connected therewith. The walls of the combustion chamber, it will be noted, are not provided with any cooling means, and therefore attain a comparatively high temperature internally, sufficiently high to prevent the deposit of any tarry matters from the fuel employed. On the upper end of the piston is a piston extension or displacer I, adapted to enter the combustion chamber, and preferably of slightly less diameter than the same. The extension may be secured to the piston in any desired manner. In the head H of the combustion chamber I place the air inlet valve L and the exhaust valve M. These are of the ordinary type, and may be operated in any desired manner, being normally held closed by springs $a$ and $b$. The valve openings are preferably connected respectively with pipes J and K. Centrally in the head H is located a fuel admission valve or injector O. This is of a well known type employed for spraying oil, P being the valve stem, and R a pipe through which compressed air may be delivered from any suitable source. The valve stem may be operated in any well known manner to admit a jet of fuel at the end of the compression stroke of the engine, which may operate on a four stroke or a two stroke cycle.

On the end of the piston extension is formed or secured a fuel distributer S. This fuel distributer is screwed into or otherwise secured to the end T of the piston extension. This end T is separated from the body of the extension by a layer $f$ of some suitable heat insulating material so that the end of the extension may reach as high a temperature as the other walls of the combustion chamber without unduly heating the rest of the extension. At one side of the distributer S the igniter V is secured to the head of the piston extension. This igniter may be of various forms, but is preferably shaped to possess a considerable surface area relative to its bulk. In the form shown I secure this by securing on a stem $m$ a series of diamond-shaped disks $n$, separated by washers $o$. I prefer, both for the spreader and the igniter, nickel, or a nickel alloy, as I have found this will best stand the intense heat in the combustion chamber, and the constant contact with the heated and burning oil. This arrangement of separate distributer and igniter I find adds greatly to the certainty of running the engine, as when the igniter and spreader are one the blast of compressed air and liquid fuel from the jet makes it exceedingly difficult to keep the igniter at a proper temperature to ignite the fuel; whereas with the present construction only a small portion of the injected fuel contacts with the igniter, and this is quite sufficient to ignite the whole. The igniter disks being of the shape shown present points of metal which are comparatively easily heated to the igniting point, while the gradual broadening of the disks back of these points insures sufficient support to prevent the points being too easily disintegrated.

In the side of the combustion chamber I form an inwardly flaring recess $h$, over which is secured a hollow cap $i$. This forms the starting igniter. In starting the engine the cap $i$ is heated to the proper temperature by a suitable torch. As soon as fuel is admitted through the injector a portion of it will splash into the recess $h$, and by contacting with the hot cap $i$ it will become ignited. As soon as the combustion chamber is well heated the torch may be removed and the running igniter V allowed to do the work. I find this arrangement much more certain and convenient than the older plan of introducing a torch into the interior of the combustion chamber for the purpose of heating it and the running igniter. Instead of using a cap heated by a torch I may employ means which I have devised whereby I am enabled to ignite a spray of oil by means of a spark electric igniter. (See Fig. 3). In this figure $u$ is a sparking plug, which in the main is of ordinary construction. The electrodes $s$ are, however, formed of a comparatively fine wire, and one is preferably arranged transversely of the plug, so that oil moving towards the end of the plug will come in contact with the electrode back of its point. A funnel-shaped end $t$ is formed on the sparking plug, which serves to concentrate the spray of oil upon the electrodes.

As I understand it the operation of this device is as follows:—The spray of oil caught by the funnel $t$ is concentrated upon the electrodes. As these are of small diameter at the points, and therefore of high resistance, they become heated a short distance back from the immediate point and vaporize the liquid fuel which strikes them. This vapor is readily ignited by the spark passing between the electrodes. I have found it practically impossible to ignite a spray of crude oil by means of electrically heated wire, or by a spark alone; whereas the arrangement I have above described will ignite a spray of liquid fuel with great certainty.

The spreader or distributer S may be made flat on top. I find it, however, decidedly preferable to cut or form a longitudinal groove $v$ in the head of the distributer, which groove is substantially in the same plane as the two igniters. This causes a concentration of the spray in the direction of the igniters. This concentration I find results in a certainty of ignition under all conditions of the load, which is otherwise not easily obtainable. I have found, particularly in starting an engine which was not constructed to give this concentration, that a greatly increased quantity of oil was required in starting the engine. With the spreader constructed as I have described I find that the excess of oil required is not nearly so great as was formerly the case. I have found, however, that when running the engine on a very light load it was frequently difficult to secure proper ignition owing to the fact that under such conditions but a small quantity of fuel is used, and this burning in a relatively large quantity of air does not produce sufficient heat to maintain the igniter at its proper temperature. I have therefore located in the pipe J leading to the air valve a valve or damper $j$, by means of which the air supply may be throttled.

The spring $b$, which ordinarily holds the exhaust valve closed, is somewhat weak. Thus on the suction stroke of the engine a portion of the exhaust from the pipe K is drawn back into the combustion chamber, when the supply of fresh air is restricted by means of the damper $j$. When a portion of the hot exhaust is thus re-used the hot gas takes the place of a considerable quantity of the cold air, and only a sufficient quantity of the latter is admitted to provide for the proper combustion of the fuel. The principle here involved is the re-use of a portion of the hot exhaust gases, and it is obvious that other means might be devised by which the necessity of using a full charge of air might be avoided, and by which the deficiency might be made up by re-using a portion of the hot products of combustion.

The general operation of the device is briefly as follows:—At the end of the compression stroke a jet of fuel is sprayed through the valve or injector O. This is distributed through the combustion chamber by the spreader S, and is ignited at the starting of the engine by the starting igniter, or when the engine is running by the igniter V. Owing to the combustion chamber being without any water jacket all its walls are very hot, that is to say, its temperature is sufficiently high to prevent the deposit of any tarry matters from the fuel which may come in contact with it. The igniter V, however, being directly in the path of the burning fuel, and containing a comparatively small amount of metal relative to its surface, reaches a much higher temperature than the walls of the combustion chamber, in operation attaining nearly a white heat which is sufficient to ignite the oil directed against it. Ignition once started combustion then proceeds rapidly throughout the spray of liquid.

I could, of course, employ my improvements in an engine constructed without the piston extension or displacer, but I obtain the best results by the construction shown.

The comparatively slow burning of an injected liquid in an ordinary cylinder would result in a great loss of heat through the cylinder walls, and thus cause a loss of power through the cooling of the working medium by the water jacket or other cooling means employed; but by employing a separate combustion chamber and a displacer the combustion chamber may be insulated and the heat conserved, while the cylinder and piston proper are each maintained cool enough for proper lubrication, as they scarcely contact with the heated gases.

From the above description it will be seen that I have devised an engine in which crude petroleum may be employed as fuel with the greatest possible advantage. Ignition, both when starting and during running, is simple and certain. The combustion, while rapid and complete, is not in the nature of an explosion. Further, the heat produced by the combustion of the fuel is utilized to the greatest possible extent, the loss through the necessary cooling of the cylinder proper being reduced to a minimum. I have also provided effective means for making the running of the engine certain under a light load, thus completely overcoming a weak point existing in engines in which the internal heat was depended upon for ignition.

What I claim as my invention is:—

1. In an internal combustion engine the combination with a liquid fuel jet and a piston, of a spreader secured to the piston in the path of the fuel from the jet; and a fuel igniter secured to the piston and located in the path of the fuel deflected from the spreader, and adapted to be maintained by the heat of combustion at a higher temperature than the walls of the combustion chamber, substantially as described.

2. In an internal combustion engine the combination with a liquid fuel jet, and a piston, of a spreader secured to the piston in the path of the fuel from the jet and projected above the adjacent surface of the chamber and of small area relative thereto; and a fuel igniter secured to the piston and located in the path of the fuel deflected from the spreader, and adapted to be maintained at a higher temperature than the walls of the combustion chamber, substantially as described.

3. In an internal combustion engine the combination with a liquid fuel jet and a piston, of a spreader of small diameter relative to the piston secured to but insulated from the piston; and a fuel igniter located in the path of the fuel deflected from the spreader, and adapted to be maintained at a higher temperature than the walls of the combustion chamber, substantially as described.

4. In an internal combustion engine the combination with a liquid fuel jet and a piston, of a spreader of small diameter relative to the piston secured to but insulated from the piston; and a fuel igniter located in the path of the fuel deflected from the spreader, and adapted to be maintained by the heat of combustion at a higher temperature than the walls of the combustion chamber, substantially as described.

5. In an internal combustion engine the combination of a combustion chamber adapted to be maintained at a lower temperature than the ignition point of the fuel; a piston; a liquid fuel jet; a spreader secured to the piston in the path of the fuel; and a projecting metal part secured to the piston and in the path of the fuel deflected from the spreader of large surface area relative to its mass whereby it is maintained by the heat of combustion at a temperature above the ignition point of the fuel, substantially as described.

6. In an internal combustion engine having a combustion chamber into which fuel is injected substantially at the end of the compression stroke, the combination of an internal igniter secured to the piston adapted to be maintained at an igniting temperature by the combustion of the fuel; and a starting igniter in one wall of the chamber adapted to be heated from without, the engine being arranged and each igniter so located as to be in the path of part of the injected fuel at the time of injection, substantially as described.

7. In an internal combustion engine the combination with a liquid fuel jet of a spreader located within the combustion chamber in the path of the fuel from the jet; and a fuel igniter located in the path of the fuel deflected from the spreader, and adapted to be maintained at a higher temperature than the spreader and the walls of the combustion chamber, the spreader having a groove formed therein tending to concentrate the spray in the direction of the igniter, substantially as described.

8. In an internal combustion engine the combination of a combustion chamber adapted to be maintained at a lower temperature than the ignition point of the fuel; a liquid fuel jet; a spreader in the path of the fuel; and a projecting metal part within the chamber and in the path of the fuel deflected from the spreader of large surface area relative to its mass whereby it is maintained by the heat of combustion at a temperature above the ignition point of the fuel, the spreader having a groove formed therein tending to concentrate the spray in the direction of the igniter, substantially as described.

9. In an internal combustion engine having a combustion chamber into which fuel is injected substantially at the end of the compression stroke, the combination of an internal igniter adapted to be maintained at an igniting temperature by the combustion of the fuel; a starting igniter in one wall of the chamber adapted to be heated from without; and a spreader between the two igniters in the path of the jet of fuel at the time of ignition, substantially as described.

10. In an internal combustion engine having a combustion chamber into which fuel is injected substantially at the end of the compression stroke, the combination of an internal igniter adapted to be maintained at an igniting temperature by the combustion of the fuel; a starting igniter in one wall of the chamber adapted to be heated from without; and a spreader in the path of the jet of fuel, shaped to effect a partial concentration of the spray of fuel in the direction of the igniters, substantially as described.

11. In an internal combustion engine the combination with a liquid fuel jet of a spreader located within the combustion chamber in the path of the fuel from the jet; and a fuel igniter located in the path of the fuel deflected from the spreader, and adapted to be maintained at a higher temperature than the walls of the combustion chamber, the spreader being shaped to effect a partial concentration of the spray in the direction of the igniter, substantially as described.

12. In an internal combustion engine of the class described in which the heat of combustion is utilized for ignition purposes the combination, with fuel and air-admitting means, of means for varying the fuel supply, means for utilizing a portion of the hot exhaust to take the place of a portion of the charge of air, and means for varying the quantity of exhaust so re-used in inverse ratio to the fuel supply, substantially as described.

13. In an internal combustion engine of the class described in which the heat of combustion is utilized for ignition purposes, the combination of fuel and air admitting means; a normally spring closed exhaust valve; and means for throttling the air supply to cause exhaust gases to be re-admitted to the engine against the pressure of said spring, substantially as described.

14. In an internal combustion engine of the class described in which the combustion chamber must be kept hot, the combination of fuel and air admitting means; a normally spring closed exhaust valve; means for regulating the fuel supply; and means for throttling the air supply to cause exhaust gases to be re-admitted to the engine against the pressure of said spring, substantially as described.

15. In an internal combustion engine having a combustion chamber into which fuel is injected substantially at the end of the compression stroke, the combination of an internal igniter adapted to be maintained at an igniting temperature by the combustion of the fuel; a starting igniter in one wall of the chamber adapted to be heated from without; and a spreader adapted at the time of injection of the fuel to direct part of the fuel against each igniter, substantially as described.

16. In an internal combustion engine having a piston and a combustion chamber into which fuel is injected substantially at the end of the compression stroke, the combination of an internal igniter secured to the piston and adapted to be maintained at an igniting temperature by the combustion of the fuel; a starting igniter in one wall of the chamber adapted to be heated from without; and a spreader adapted at the time of injection of the fuel to direct part of the fuel against each igniter, substantially as described.

Toronto, Ont., 7th February, 1907.
HOWARD A. JOHNSTON.
Signed in the presence of—
J. EDW. MAYBEE,
F. W. McKENDRICK.